United States Patent
Otoshi

[19]

[11] Patent Number: 6,166,932
[45] Date of Patent: Dec. 26, 2000

[54] DC-TO-AC CONVERTER WITH OVER-CURRENT PROTECTION

[75] Inventor: Kota Otoshi, Kariya, Japan

[73] Assignee: Kabushiki Kaisha Toyoda Jidoshokki Seisakusho, Kariya, Japan

[21] Appl. No.: 09/357,082

[22] Filed: Jul. 20, 1999

[30] Foreign Application Priority Data

Jul. 21, 1998 [JP] Japan .................................. 10-205402

[51] Int. Cl.$^7$ ........................... H02M 3/335; H02M 7/68; H02H 7/122
[52] U.S. Cl. .................................. 363/56; 363/25; 363/98
[58] Field of Search ................................. 363/24, 25, 40, 363/55, 56, 95, 98, 131, 132

[56] References Cited

U.S. PATENT DOCUMENTS

| | | | |
|---|---|---|---|
| 5,113,337 | 5/1992 | Steigerwald | 363/40 |
| 5,243,509 | 9/1993 | Laeuffer | 363/17 |
| 5,274,540 | 12/1993 | Machara | 363/37 |
| 5,285,372 | 2/1994 | Huynh et al. | 363/132 |
| 5,625,539 | 4/1997 | Nakata et al. | 363/17 |
| 5,774,351 | 6/1998 | Hsieh et al. | 363/132 |
| 5,875,107 | 2/1999 | Nagai et al. | 363/132 |

FOREIGN PATENT DOCUMENTS 9-247950  9/1997  Japan ............................... H02M 7/48

*Primary Examiner*—Peter S. Wong
*Assistant Examiner*—Bao Q. Vu
*Attorney, Agent, or Firm*—Morgan & Finnegan, L.L.P.

[57] ABSTRACT

A DC-to-AC converting circuit generates an alternating current by alternately switching a set of switching elements. The alternating current is supplied to a load Lo via an output filtering circuit. If a current detection resistor R1 in the DC-to-AC converting circuit detects an output current that exceeds a reference voltage Vref corresponding to an over-current set value, certain switching elements are turned off to disconnect the DC-to-AC converting circuit from the power source. However, the DC-to-AC converting circuit continues to generate an alternating current from energy stored in one or more inductors that are coupled to the DC-to-AC converting circuit. Preferably, a closing circuit is formed from a diode, a switching element, the load Lo and the inductors. Thus, even if the DC-to-AC converting circuit is disconnected from its power source, an alternating current continuously flows to the load Lo.

20 Claims, 4 Drawing Sheets

DC-TO-AC CONVERTER WITH OVER-CURRENT PROTECTION

BACKGROUND OF THE INVENTION

1. Field of the Invention

The present invention relates to DC-to-AC converters for generating an alternating current from a direct current and, in particular, relates to DC-to-AC converters having an over-current protection feature, which prevents the output current from becoming higher than an over-current set value.

2. Description of the Related Art

A known DC-to-AC converter is described in Japanese Laid-open Patent Publication No. 9-247950 and is shown in FIG. 3. This DC-to-AC converter generates an alternating current from a direct current voltage, which is supplied, e.g., by a vehicle battery. The known DC-to-AC converter has an input filtering circuit 1, a voltage boosting circuit 2 and a direct current/alternating current (DC-TO-AC) converting circuit 3.

The input filtering circuit 1 reduces noise from the input terminals TA1 and TA2 attached to the direct current voltage and reduces noise generated in the DC-to-AC converter that is outputted externally through the input terminals TA1 and TA2.

The voltage boosting circuit 2 boosts the direct current voltage conducted via the input filtering circuit 1. That is, by alternately turning on and off field-effect transistors TR1 and TR2, the first control circuit CR1 generates an alternating current in the secondary side coil of the transformer T1 and the voltage of the alternating current corresponds to the winding ratio between the primary side coil and the secondary side coil. Rectifier RE rectifies the alternating current to charge capacitor C3.

The DC-to-AC converting circuit 3 converts the voltage across capacitor C3 into an alternating current of a predetermined frequency by alternately turning on and off two sets of field-effect transistors (TR3, TR4 and TR5, TR6) and outputs the alternating current to a load.

In addition, a current detecting resistor R1 detects the output current IL from the DC-TO-AC circuit 3. The second control circuit CR2 turns off transistors TR3 and TR5, thereby disconnecting the output current IL, when the output current IL detected by the current detection resistor R1 exceeds an over-current set value OC. The second control circuit CR1 turns on the transistors TR3 and TR5 again when the output current IL drops below the over-current set value OC. In addition, transistors TR4 and TR6 can be turned off as well. Thus, by preventing the output current from exceeding the over-current set value, the transistors (TR3–TR6) are protected from damage caused by excess current.

Such a known DC-to-AC converter can be utilized to power, e.g., a television set, which usually has a power source circuit as shown in FIG. 4. This circuit includes a rectifier D for rectifying an alternating current applied to the input terminals TA5 and TA6, an electrolytic capacitor C having a large capacity to smooth the direct current voltage rectified by the rectifier D and other elements. The voltage stored on capacitor C can be supplied to the respective circuits in the television set, to voltage monitoring circuits of a microcomputer MC, and other circuits. In addition, a relay RL is typically connected between the input terminal TA6 and the rectifier D. If the microcomputer MC detects an abnormality, such as the voltage of capacitor C does not reach a predetermined voltage within a fixed period of time after the power source switch (not illustrated) of the television set has been turned on, the microcomputer MC disconnects the relay RL. Therefore, the television power source circuit will be disconnected from the AC power source. The power source circuit shown in FIG. 4 exhibits capacity load characteristics, because the capacity of the electrolytic capacity C is large.

Problem with the Related Art

When the power source circuit shown in FIG. 4 is connected to the DC-to-AC converter shown in FIG. 3, the television may not operate. For example, if the input terminals TA5 and TA6 of the power source circuit shown in FIG. 4 are connected to the output terminals TA3 and TA4 of the DC-to-AC converter shown in FIG. 3 and the television power source switch is turned on, an alternating current voltage will be supplied from the DC-to-AC converter to the power source circuit of the television. If capacity C is in a state of discharge, as is common when the television has not been used for a period of time, the impedance of the capacity C is relatively small. Therefore, a large current will initially flow into capacitor C when the television power switch is turned on. However, if the initial current (i.e., output current IL) exceeds the over-current set value OC, the second control circuit CR2 will turn off transistors TR3–TR6 and thereby disconnect the output current IL from capacitor C.

As shown in FIG. 5, the output current IL is disconnected at time t2, which is slightly delayed from time t1 when the output current IL exceeded the over-current set value OC. Shortly thereafter, the output current IL will become less than the over-current set value OC and the second control circuit CR2 will again turn on transistor TR3 or TR5 (and transistor TR4 or TR6). Consequently, the output current IL will begin flowing again at time t4 (when the output current IL is nearly zero), which is slightly delayed from time t3 when the output current IL, became less than the over-current set value OC (See FIG. 5). Once the output current IL exceeds the over-current value OC, the output current will be disconnected again. This "ON/OFF" operation may continue for a substantial period of time.

When the output current from the DC-to-AC converter is disconnected, charge supplied to capacitor C shown in FIG. 4 becomes less. As a result, the time for capacitor C to reach a predetermined voltage is longer than if capacitor C is continuously charged. If the voltage of capacitor C does not reach the predetermined voltage within the predetermined time, the television will not operate, because the microcomputer MC of the television set will disconnect the television from the DC-to-AC converter by turning off the relay RL.

One possibility for overcoming this problem is to increase the over-current set value in order to charge capacitor C more quickly. However, this technique is not particularly useful, because it will become necessary to use switching elements having higher-rated current thresholds, which switching elements are generally more expensive.

SUMMARY OF THE INVENTION

It is, accordingly, an object of the invention to provide improved DC-to-AC converters.

Preferably, DC-to-AC converters are taught that are capable of boosting a load voltage in a short time even if the DC-to-AC converter has over-current protection and if the power source for the load exhibits capacity load characteristics. By designing the DC-to-AC converter in this manner, it is not necessary to use higher-rated switching elements and the problem of the known DC-to-AC converter described above can be avoided.

More preferably, the DC-to-AC converter can supply a current to a load even if the output current exceeds an over-current set value and the over-current protection feature operates to protect the switching elements. In order to achieve this feature, a current maintaining circuit may be utilized that will permit an alternating current to flow to the load, even if the output current exceeds the over-current set value. Thus, by not disconnecting the alternating current from the load each time that the output current exceeds an over-current set value, it is possible to boost the voltage of a load having capacity load characteristics in a short time.

In one aspect, a closed circuit for charging the load even when the output current exceeds an over-current set value may be utilized to perform the current maintaining function in the DC-to-AC converter. An inductor may be utilized in the closed circuit, whereby energy is accumulated in the inductor by causing an output current to flow to the inductor. Thus, an alternating current may continuously flow to the load as a result of the energy accumulated in the inductor. Such a design provides a simple configuration for the closed circuit.

This inductor may simultaneously perform a filtering function to reduce noise that is transmitted to the noise, while limiting the number of components that are necessary to perform both the charge maintaining function and the filtering function.

Other objects, features and advantages of the present invention will be readily understood after reading the following detailed description together with the accompanying drawings and the claims.

DETAILED DESCRIPTION OF THE INVENTION

Figure 1:
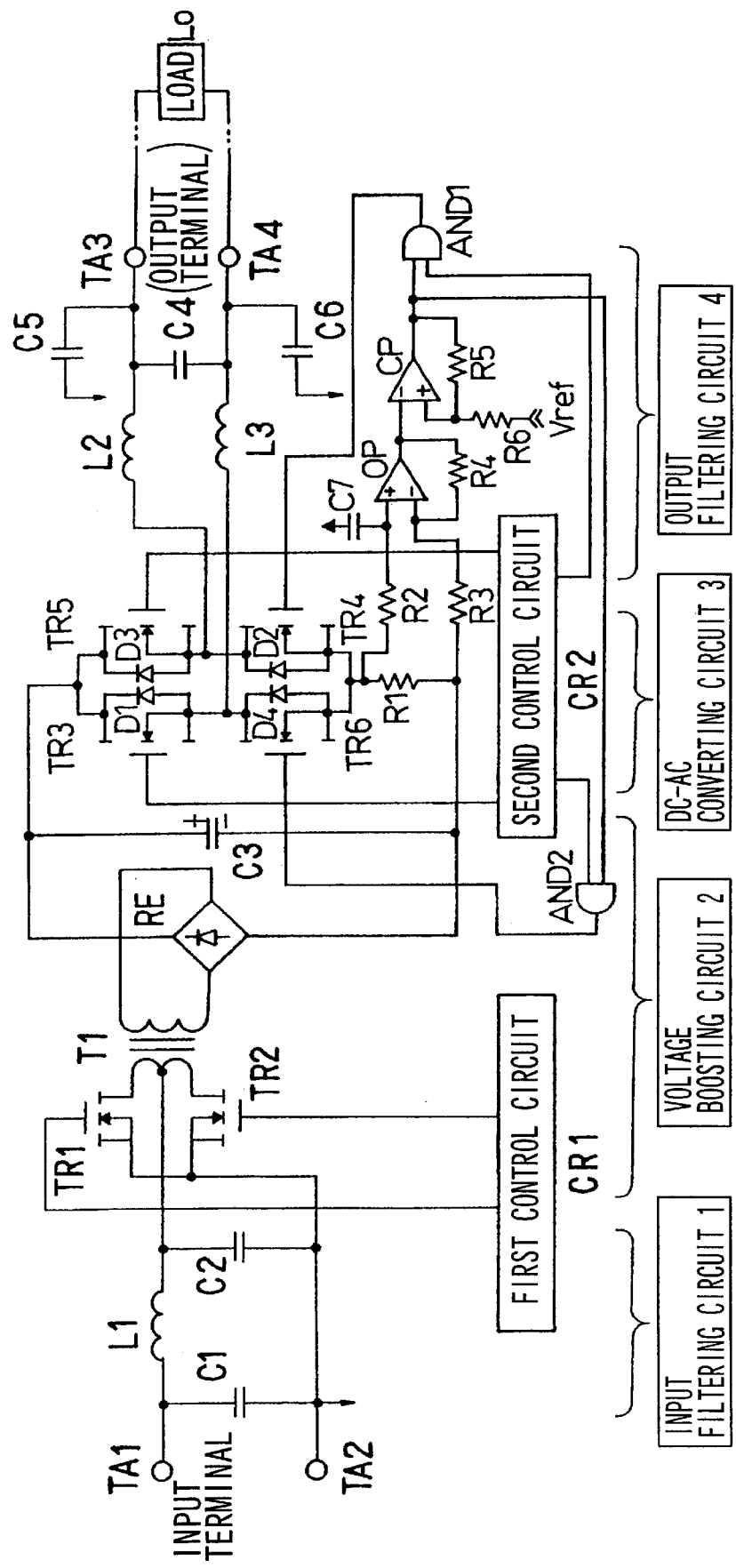
FIG. 1 is a diagram of a representative DC-to-AC converter.

Preferably, circuits are taught that include a DC-to-AC converter, an output current detecting circuit coupled to the DC-to-AC converter and an energy storing circuit coupled to the DC-to-AC converter. The DC-to-AC converter is preferably disconnected from its power source if the output current exceeds a predetermined value. However, the DC-to-AC converter preferably continues to generate an alternating current from energy stored in the energy storing circuit. The energy storing circuit preferably is a closed circuit that may include the load within the closed circuit. Such closed circuit may also include an inductor. The DC-to-AC converter may further include a filtering circuit to reduce noise from the alternating current generated by the DC-to-AC converter and the inductor in the closed circuit may also perform the filtering function. The DC-to-AC converter may also include a voltage boosting circuit for boosting the DC voltage of the power source and/or a filtering circuit for reducing noise from the power supply.

More preferably, the DC-to-AC converter may have a series circuit between a first switching element and a fourth switching element and a series circuit between a third switching element and a second switching element. Both of these connections may be parallel to a positive input terminal and a negative input terminal. The connection point between the first switching element and the fourth switching element and the connection point between the third switching element and the second switching element are respectively connected to AC output terminals. A diode may be connected to at least one of the first and third switching elements disposed at the positive input terminal side and at least one of the second and fourth switching elements disposed at the negative input terminal side, which diode may comprise an aspect of the closed circuit.

The DC-to-AC converter may preferably include a control circuit that turns off the switching elements having a diode connected in parallel. The closed circuit and the control circuit may function together to disconnect the switching elements from the power source when the output current exceeds the over-current set value, but allow alternating current to continue to flow to the load.

The energy storing circuit may preferably include a inductor that is connected to at least one of the connection points between either (1) the first switching element and fourth switching element or (2) the third switching element and second switching element. This inductor may comprise an aspect of the closed circuit and/or may comprise an aspect of a filtering circuit for removing noise from the AC output. Most preferably, the inductor of the filtering circuit is used as an inductor for the closed circuit. A first inductor may preferably be connected to the connection point between the first switching element and the fourth switching element and a second inductor may preferably be connected to the connection point between the second switching element and the third switching element. A connection point is also known as a node.

Each of the additional features and circuits disclosed above and below may be utilized separately or in conjunction with other features and circuits to provide improved DC-to-AC converters and methods for designing and using such DC-to-AC converters. Representative examples of the present invention, which examples utilize many of these additional features and circuit in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and circuits disclosed in the following detail description may not be necessary to practice the invention in the broadest sense, and are instead taught merely to particularly describe some representative examples of the invention, which detailed description will now be given with reference to the accompanying drawings.

FIG. 1 shows a circuit diagram of a DC-to-AC converter having an input filtering circuit 1, a voltage boosting circuit 2, a DC-to-AC converting circuit 3, and an output filtering circuit 4. A control circuit and current maintaining circuit are also disclosed in this figure.

The input filtering circuit 1 may comprise capacitors C1 and C2 and an inductor (coil) L1 and may preferably be utilized to reduce noise from entering or exiting input terminals TA1 and TA2. Capacitors C1 and C2 may be, for example, aluminum electrolytic capacitors. A variety of input filtering circuit designs may be utilized to perform the input filtering circuit and the designer is not limited to the circuit specifically disclosed herein. Further, an input filtering circuit is not essential to the present teachings.

The voltage boosting circuit 2 may comprise switching elements TR1 and TR2 transformer T1, rectifier RE and capacitor C3. Switching elements T1 and T2 may be, for example, field-effect transistors (FETs), rectifier RE may be a full-wave rectification circuit, to which a diode is bridge-connected and capacitor C3 may be an aluminum electrolytic capacitor. The voltage boosting circuit 2 may preferably boost a direct current voltage supplied via the input filtering circuit 1. More preferably, the voltage boosting circuit 2 may multiply the input voltage by about ten times and this boosted voltage can be supplied to capacitor C3. Again, a voltage boosting circuit is not essential to the present teachings, as the DC-to-AC converting circuit 3 can utilize any DC power source, such as a battery or a capacitor.

In a preferred voltage boosting operation, a first control circuit CR1 controls the switching of switching elements TR1 and TR2 by alternately biasing the two switching elements. When switching element TR1 is turned on (i.e., biased to be conductive) and switching element TR2 is turned off (i.e., biased to be non-conductive), current will flow, for example, from the positive terminal of a battery connected between input terminals TA1 and TA2 to the negative terminal of the battery via the input terminal TA1, the primary side coil of the transformer T1, switching element TR1, and input terminal TA2. When switching element TR2 is turned on and switching element TR1 is turned off, current will flow from the positive terminal of the battery to the negative terminal of the battery via input terminal TA1, the primary side coil of transformer T1, switching element TR2, and input terminal TA2. Naturally, the polarity of the battery may be reversed.

By alternately switching the switching elements TR1 and TR2, the polarity of the current flowing into the primary side coil of the transformer T1 is alternately changed, so that an alternating current is generated at the secondary side coil of the transformer T1. The voltage generated at the secondary side coil of the transformer T1 is, of course, determined by the winding ratio between the primary side coil and the secondary side coil of the transformer T1. Preferably, the winding ratio is 10:1, although a variety of winding ratios can be utilized depending upon the voltage of the DC power source and the desired AC voltage.

Further, the first control circuit CR1 can be implemented with any appropriate logic circuit that will provide the desired switching signals to switching elements TR1 and TR2.

The DC-to-AC converting circuit 3 preferably comprises switching elements TR3, TR4, TR5 and TR6 connected in an H-bridge configuration and switching elements TR3–TR6 may be, for example, field-effect type transistors (FETs). However, other types of switching elements may be utilized depending upon the particular design parameters. The DC-to-AC converting circuit 3 can convert a voltage stored on capacitor 3, or a voltage from another DC power source, into an alternating current. Preferably, the alternating current outputted by the DC-to AC converter will have a voltage of 100 volts or 110 volts and a frequency of 60 Hz in order to permit the DC-to-AC converter to be utilized with commonly available commercial products. However, by changing the voltage of the DC power source and the switching frequency of the switching elements, the voltage and frequency of the desired alternating current can be easily changed.

Diodes D1, D2, D3 and D4 may be connected in parallel to each of the switching elements TR3 through TR6. If the switching element is a FET, diodes D1, D2, D3 and D4 are preferably connected in parallel between the drain and source of each respective FET. More preferably, the respective diodes D1–D4 are connected in reverse continuity to the conducting direction of switching elements TR3–TR6. That is, if TR3 normally conducts current from its source to its drain, diode D1 is connected to conduct current from the drain of TR3 to the source of TR3. Preferably, diodes D1 and D3 operate within the closed circuit that will be described further below to permit alternating current to continuously flow to a load Lo, as a result of energy accumulated in the coils L2 and L3, when the DC-to-AC converter is disconnected from capacitor C3, because the output current has exceeded an over-current set value. Diodes D1–D4 may be used as protect diodes.

In a preferred DC-to-AC converter, a second control circuit CR2 controls the switching of the switching elements TR3–TR6. The second control circuit CR1 also can be implemented with any appropriate logic circuit that will provide the desired switching signals to switching elements TR3–TR6 as follows:

When switching elements TR3 and TR4 are turned on, the positive terminal of capacitor C3 is connected to output terminal TA4 via switching element TR3 and the negative terminal of capacitor C3 is connected to output terminal TA3 via resistor R1 and switching element TR4. On the other hand, when switching elements TR5 and TR6 are turned on, the positive terminal of capacitor C3 is connected to the output terminal TA3 via switching element TR5 and the negative terminal of capacitor C3 is connected to the output terminal TA4 via resistor R1 and switching element TR6. By alternating the conductivity of switching elements TR3 and TR4 and switching elements TR5 and TR6, the polarity of the output voltage between the output terminals TA3 and TA4 is alternately changed. Thus, an alternating current can be outputted to the load $L_o$. The frequency of the alternating current voltage generated by the DC-to-AC converter is naturally determined by the ON/OFF cycle of switching elements TR3 and TR4 and switching elements TR5 and TR6.

An output filtering circuit 4 is also preferably provided, although it is not essential, and may include inductors (coils) L2 and L3 and capacitors C4, C5 and C6. The output filtering circuit 4 can be utilized to reduce noise from the alternating current generated by the DC-to-AC converting circuit 3. Other output filtering circuits can be utilized with the present teaching to perform this noise reducing function. The alternating current outputted through the output filtering circuit 4 may be directly supplied to a load $L_o$ connected to the output terminals TA3 and TA4 or other power supply circuitry may be interposed between the output terminals TA3 and TA4 and the load $L_o$.

Next, a preferred control circuit for disconnecting the DC-to-AC converter from capacitor C3 when the output current of the DC-to-AC converting circuit exceeds an over-current set value will be described. Preferably, resistor R1 is utilized to perform the over-current detecting function. In particular, resistor R1 will generate a voltage based upon the output current IL that is supplied to the output terminals TA3 and TA4.

Resistor R1 may be connected in series with the bridging circuit of DC-to-AC converting circuit 3 and preferably, both ends of the current detecting resistor R1 are connected to input terminals (+, −) of an operational amplifier OP via resistors R2 and R3. Resistor R4 is connected to the operational amplifier OP in a feedback configuration to determine the gain of the operational amplifier and capacitor C7 may be utilized to filter noise. The output terminal of the operational amplifier OP is preferably connected to the negative (−) input terminal of comparator CP and the positive (+) input terminal is connected to a reference voltage Vref, which corresponds to an over-current set value. Thus, the comparator CP can generate a first signal if the current conducted by resister R1 is less than the over-current set value and can generate a second signal if the current conducted by resistor R1 is greater than the over-current set value. Therefore, the output of the comparator CP is a binary output reflecting the level of the output current.

The output terminal of the comparator CP may be connected to one input terminal of a first two-input type AND element AND1. A control signal generated by the second control circuit CR2 is applied to the second input terminal of the AND element AND1. The output terminal of the AND element AND1 is connected to the switching element TR4. When a field-effect transistor is used as switching element TR4, the output terminal of the AND element AND1 is connected to the gate of the field-effect transistor.

The output terminal of the comparator CP is also connected to one input terminal of a second two-input type AND element AND2. A control signal generated by the second control circuit CR2 is applied to the second input terminal of the AND element AND2. The output terminal of the AND element AND2 is connected to switching element TR6.

As shown in FIG. 1, the second control circuit CR2 outputs control signals for switching elements TR3 and TR5, which control signal are applied directly to switching elements TR3 and TR5. The second control circuit CR2 also outputs control signals for switching elements TR4 and TR6. However, these control signals are applied to AND elements AND1 and AND2 and the AND elements AND1 and AND2 generate the control signals that are applied to switching elements TR4 and TR6. In addition, comparator CP outputs a first binary signal, for example a high ([H]) signal, when the output current IL detected by the current detecting resistor R1 is less than the over-current set value OC (that is, when both-end voltages of the current detecting resistor R1 are less than the reference voltage Vref). The comparator outputs a second binary signal, for example a low ([L]) signal, when the output current exceed the over-current set value OC.

Preferably, when the output current IL is less than the over-current set value OC, the control signals generated by the second control circuit CR2 are applied to switching elements TR4 and TR6, because the AND elements AND1 and AND2 simply pass these control signals when the output current IL is less than the over-current set value OC. On the other hand, when the output current IL exceeds the over-current set value OC (that is, when both-end voltages of the current detecting resistor R1 are greater than the reference voltage Vref), the switching elements TR4 and TR6 are turned off by the control signals generated by AND elements AND1 and AND2.

As discussed herein, a preferred control circuit for disconnecting capacitor C3 from the DC-to-AC converter if an over-current state is detected in the DC-to-AC converter may comprise, for example, the second control circuit CR2, operational amplifier OP, comparator CP, AND elements AND1 and AND2. However, various modifications to this preferred control circuit can naturally be made by a person of skill in the art while maintaining the preferred control function.

A current maintaining circuit that permits current to flow to the load even when the DC-to-AC converting circuit has been disconnected from capacitor C3 by the control circuit also will be described in further detail. The preferred current maintaining circuit includes a closed circuit in which the load is within the closed circuit. Other current maintaining circuits can naturally be designed that will perform this desired function.

In this representative example, diodes D1 and D3 form an aspect of the closed circuit and permit alternating current to continuously flow to the load $L_o$ when the output current exceeds the over-current set value. In order to explain the operation and function of this closed circuit, a description will be provide for the case in which switching elements TR3 and TR4 are turned on and switching elements TR5 and TR6 are turned off. In this state, if the output current exceeds the over-current set value, the output signal of the comparator CP is a low ([L]) signal. Consequently, AND element AND1 also outputs a [L] signal, thereby turning off switching element TR4. In this example, the switching elements are N-type FETs. However, those skilled in the art will readily recognize that P-type FETs may be utilized if the polarity of the control signals is switched.

If switching element TR3 is turned on, but switching elements TR4–TR6 are turned off, alternating current will continue to flow in the closed circuit, because energy has accumulated in the inductors L2 and L3. In particular, a first current path is comprised of switching element TR3, coil L3, output terminal TA4, load $L_o$, coil L2 and diode D3. Likewise, if switching element TR5 is turned on and TR6 is turned off because an over-current state was detected by the control circuit (switching elements TR3 and TR4 are also turned off), a second current path is formed by switching element TR5, coil L2, load $L_o$, coil 13 and diode D1. Thus, if switching elements TR3 and TR5 continue to be alternately switched by the second control circuit CR, when the over-current state is detected by the comparator CP (and switching elements TR4 and TR6 are turned off to thereby protect the switching elements from damage), an alternating current will continue to flow to the load $L_o$ via this current maintaining circuit. Thus, during the normal operation of the DC-to-AC converter, capacitor C3 supplies the energy that is converted into an alternating current and is supplied to the load $L_o$. However, in the over-current state, the inductors L2 and L3 supply the energy that is converted into an alternating current and is supplied to the load $L_o$.

The representative DC-to-AC converter may operate as follows. The first control circuit CR1 may alternately turn on and off switching elements TR1 and TR2, so that an alternating current is supplied to the primary side coil of a transformer T1 via the input filtering circuit 1. Therefore, an AC voltage will be generated on the secondary side of the transformer TR1 in proportion to the winding ratio of the primary side coil and secondary side coil. Thereafter, the AC voltage generated at the secondary side coil of the transformer T1 is supplied to capacitor C3 after being rectified by rectifier RE.

While capacitor C3 is being charged by the voltage boosting circuit 2, the second control circuit CR2 may alternately turn on and off switching elements TR3 and TR4 and switching elements TR5 and TR6. For example, the second control circuit CR2 may output an ON control signal to switching element TR3 and to AND element AND1, in the form of a high [H] signal if TR3 and TR4 are N-type FETs, which ON signal will turn on switching element TR3. If the output of AND element AND1 also is a high [H] signal, switching element TR4 also will be turned on. At the same time, the second control circuit CR2 outputs an OFF control signal, e.g. a low [L] signal, to switching element TR5 and the AND element AND2. If AND element AND2 also outputs an [L] signal, switching elements TR5 and TR6 will be turned off. A pulse width modulation (PWM) signal may be used as the ON control signal to be outputted to the AND element AND1.

If both-end voltages of the current detecting resistor R1 are less than the reference voltage Vref, the comparator CP outputs an [H] signal and therefore, the AND element AND1 also outputs an [H] signal. In this case, both switching elements TR3 and TR4 are turned on. Therefore, current will flow from the positive terminal of capacitor C3 to the negative terminal of capacitor C3 via switching element TR3, coil L3, output terminal TA4, load $L_o$, output terminal TA3, coil L2, switching element TR4 and current detecting resistor R1, thereby causing the output voltage of the output terminal TA4 to become positive and the output voltage of the output terminal TA3 to become negative. Naturally, energy is being stored in coil L2 and L3 during this operation.

The second control circuit CR2 then outputs an OFF control signal, i.e. a low [L] signal, to switching element TR3 and AND element AND1, which turns off switching elements TR1 and TR4, if AND element AND1 also outputs an [L] signal. Simultaneously, the second control circuit CR2 outputs an ON control signal, i.e. an [H] signal to switching element TR5 and AND element AND2, which turns on switching elements TR5 and TR6, if AND element AND2 also outputs an [H] signal. Both AND elements AND1 and AND2 will output an [H] signal, if both-end voltages of the current detecting resistor R1 are less than the reference voltage Vref, because the output signal of the comparator CP will be an [H] signal. In this case, current will flow from the positive terminal of capacitor C3 to the negative terminal of capacitor 3 via switching element TR5, coil L2, output terminal TA3, load $L_o$, output terminal TA4, coil L3, switching element TR6 and current detecting resistor R1, thereby causing the output voltage of the output terminal TA3 to become positive and the output voltage of the output terminal TA4 to become negative. Thus, by alternately turning on and off switching elements TR3 and TR4 and switching elements TR5 and TR6, an alternating current having a frequency corresponding to the ON and OFF cycle is outputted from the output terminals TA3 and TA4.

In the event that the output current IL exceeds the over-current set value OC during the ON state of either switching elements TR3 and TR4 or switching elements TR5 and TR6, both-end voltages of the current detecting resistor R1 will exceed the reference voltage Vref. Therefore, the output signal of the comparator CP will change to a [L] signal, so that the output signals of AND element AND1 and AND2 also will change to a [L] signal. Consequently, switching elements TR4 and TR6 will be turned off, thereby interrupting the supply of current from capacitor C3 to load $L_o$. However, alternating current will continuously flow to the load $L_o$ via the closed circuit, which includes the diodes D1 and D3 and coils L2 and L3, even though the DC-to-AC converting circuit has been effectively disconnected from capacitor C3.

Figure 4:
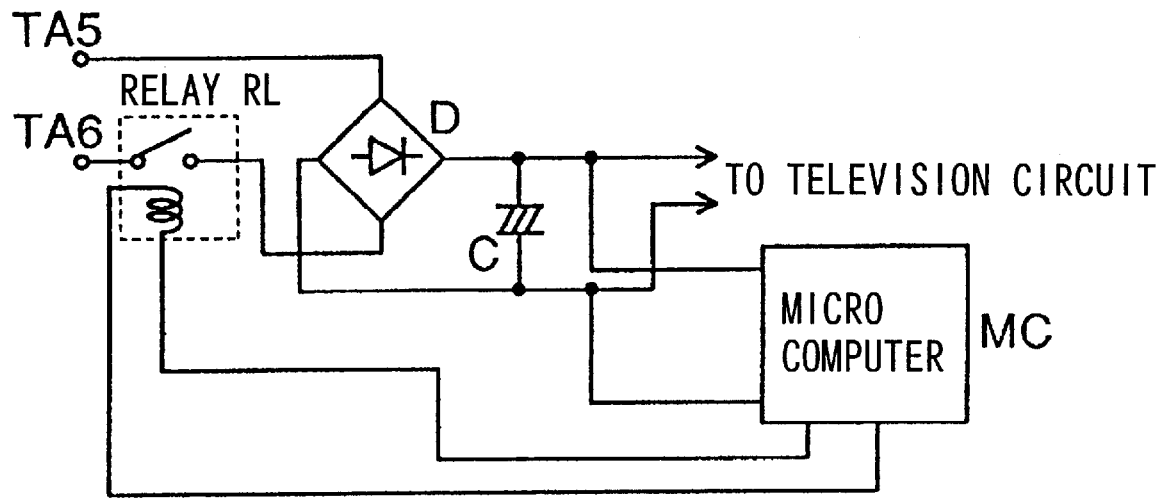
FIG. 4 is a diagram of a known television power source circuit (which is a load exhibiting capacity load characteristics)
Figure 5:
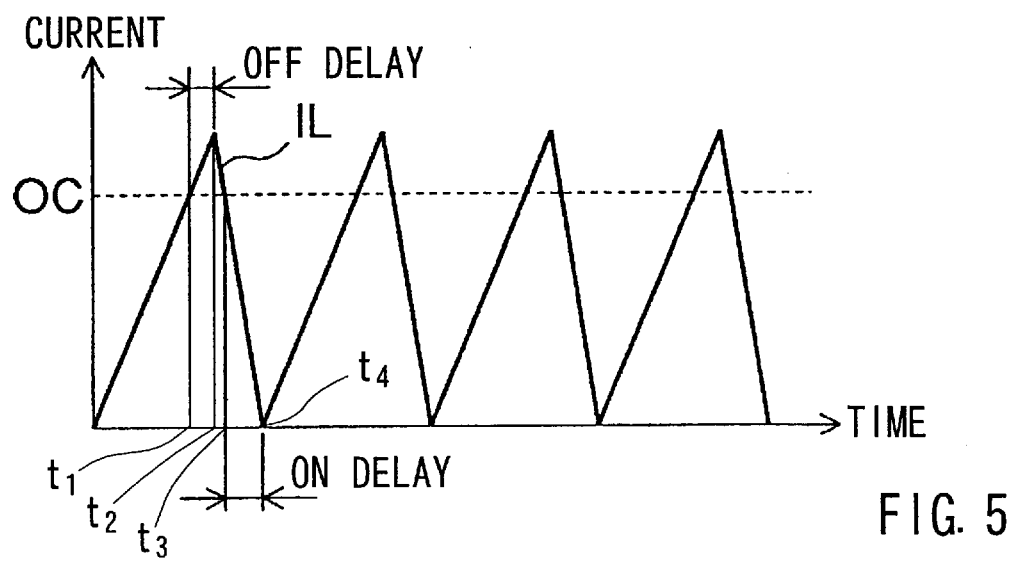
FIG. 5 is a waveform diagram of the current supplied to the load when the load is connected to the known DC-to-AC converter of FIG. 3.

One particular advantage of this DC-to-AC converter will be demonstrated by a description of an example in which the input terminals TA5 and TA6 of the television power source circuit shown in FIG. 4 are connected to the output terminals TA3 and TA4 of the DC-to-AC converter. As described above, the television microcomputer MC will turn off the relay RL if the voltage of the capacitor C does not reach a predetermined value within a predetermined time after the power source switch has been turned on. Further, when the television power source switch is turned on, capacitor C is likely to be in state of discharge. Therefore, a large current will initially flow into capacitor C, because the impedance of capacitor C is relatively low at this time.

Due to the stress on the DC-to-AC converter to charge capacitor C, the output current IL may exceed the over-current set value OC, thereby causing the output signal of comparator C to change to an [L] signal. For example, if the output of comparator CP goes low when switching elements T3 and TR4 are turned on, the output signal of the AND element AND1 also will go low, so that switching element TR4 will be turned off. As a result, current supplied from capacitor C3 to the television power source circuit (load $L_o$) via switching element TR4 will be disconnected. However, current will continue to flow to charge capacitor C of the television power source, because switching elements TR3 and TR4 will continued to be alternately turned on and off, thereby supplying an alternating current from the energy accumulated in the coils L2 and L3. Because the current flowing through the closing circuit gradually decreases as capacitor C continues to be charged, an over-current or over-voltage condition will not damage the switching elements.

Once both-end voltages of the current detection resistor R1 become less than the reference voltage Vref, the output of comparator CP will go high again, thereby changing the output signal of the AND element AND1 to an [H] signal. Thus, the switching element TR4 will again be turned on. Therefore, current will flow again from the positive terminal of capacitor C3 to the negative terminal of capacitor C3 via switching element TR3, coil L3, output terminal TA4, the television power source circuit, output terminal TA3, coil L2, switching element TR4, current detection resistor R1 and capacitor C3.

The same operation is performed when the current detection resistor R1 detects an output current IL that exceeds the over-current set value while switching elements TR5 and TR6 are turned on. In that case, switching element TR6 will be turned off by the output signal of the AND element AND2 will change from high to low. As a result, the closed circuit will continue to provide alternating current to capacitor C from the energy stored in the inductors. By repeating the above operations each time that the output current IL exceeds the over-current set value OC, capacitor C can be continuously charged without interrupting the alternating current.

Figure 2:
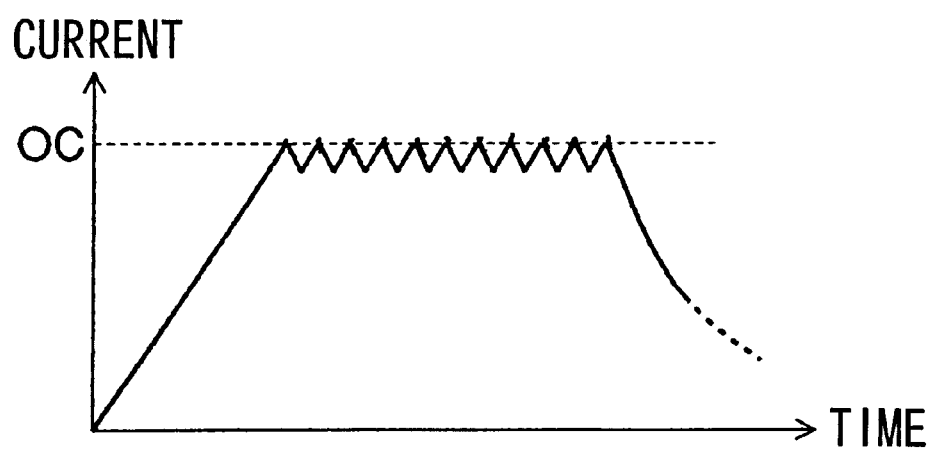
FIG. 2 is a waveform diagram of a current supplied to a load when the load is connected to the DC-to-AC converter of FIG. 1.
Figure 3:
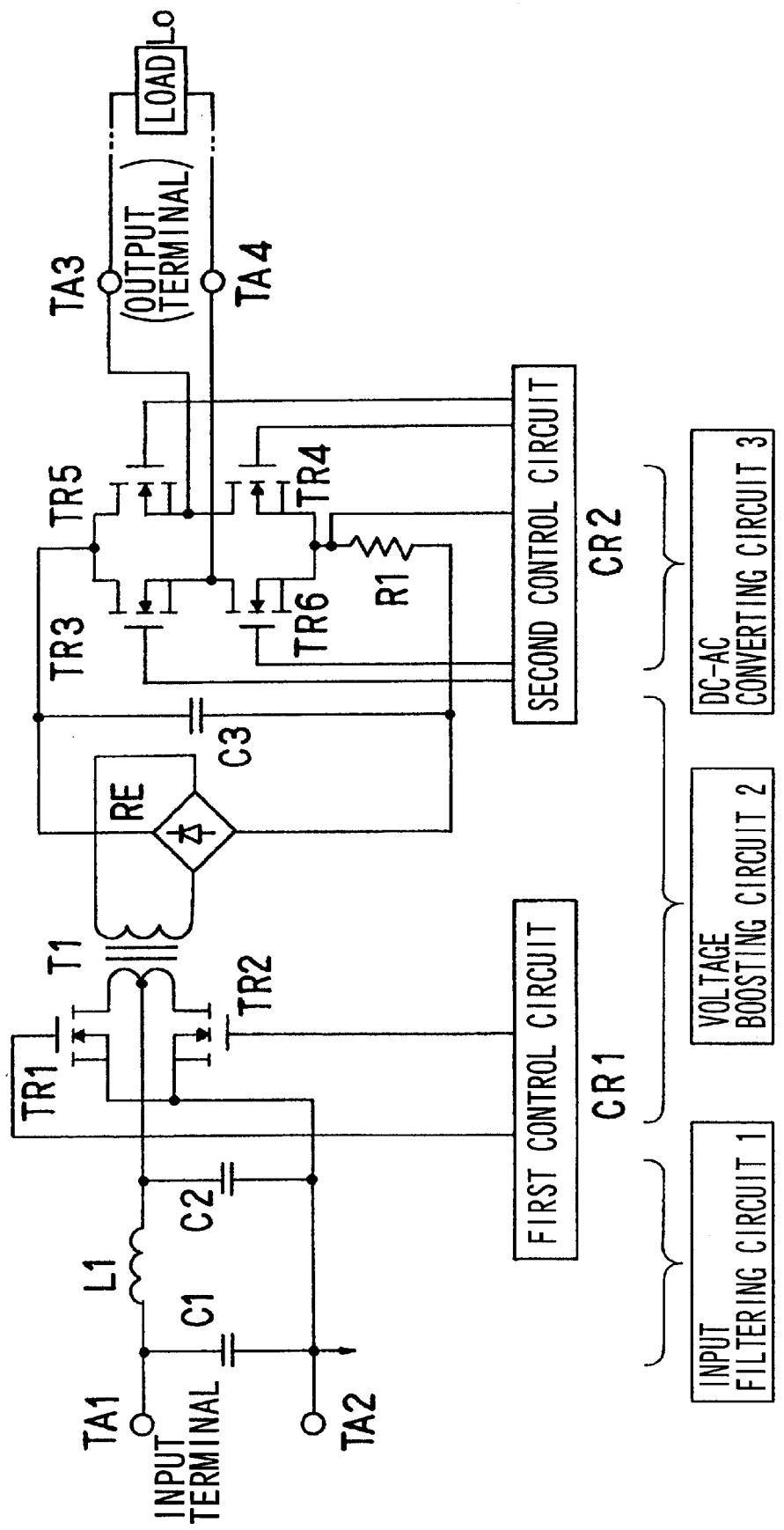
FIG. 3 is a diagram of a known DC-to-AC converter.

FIG. 2 shows a waveform diagram of current supplied to capacitor C of the television power source circuit according to this example, in which the power source circuit shown in FIG. 4 is connected to the DC-to-AC converter of FIG. 1. When the television power source switch (not illustrated) is turned on, current is supplied to the capacitor C. If the impedance of capacitor C is low because capacitor C is in a state of discharge, a large current will begin to flow to capacitor C. Accordingly, if the output current IL exceeds the over-current set value OC, switching elements TR4 and TR6 will be turned off. Because the closed circuit continues to supply an alternating current to capacitor C from the energy accumulated in the coils L2 and L3, capacitor C is continuously charged. That is, if the output current IL exceeds the over-current set value, capacitor C will be continuously charged using the present DC-to-AC converters, but the charging of capacitor C would have been interrupted using the known DC-to-AC converter (See FIG.

5). Therefore, capacitor C can be reliably charged to the predetermined voltage within the predetermined time and thereby ensure that the television operates properly, because the television microcomputer MC will not sense an abnormality and turn off the relay RL. Further, because it is not necessary to use high rated switching elements in such DC-to-AC converters, it is possible to make inexpensive, but reliable, DC-to-AC converters.

While the above representative embodiment described an operation that may be stopped if a load voltage does not reach a predetermined voltage within a predetermined time, the present teachings are applicable to any load having capacity load characteristics. That is, by using the present teachings, it is possible to boost the load voltage of any load having capacity load characteristics to the predetermined value in a short time.

Although the representative DC-to-AC converter of FIG. 1 comprises an input filtering circuit 1, a voltage boosting circuit 2, a DC-to-AC converting circuit 3 having switching elements T3 through TR6 connected in an H-bridge configuration and an output filtering circuit 4, the construction of the DC-to-AC converter may be variously modified. For example, the input filtering circuit 1, voltage boosting circuit 2 and output filtering circuit 4 may be omitted. However, if the output filtering circuit 4 is omitted, an inductor is preferably provided to store energy for the current maintaining circuit. Further, although coils L2 and L3 of the output filtering circuit 4 were used as inductors in the current maintaining circuit, such inductors may be used exclusively for commutation. Moreover, although the current maintaining circuit was constructed using inductors, the current maintaining circuit may be any such circuit that causes current to flow to a load when the output current exceeds an over-current set value.

While the output terminals of AND elements AND1 and AND2 were connected to switching elements TR4 and TR6 in the representative example, the output terminals of the AND elements AND1 and AND2 may be connected instead to switching elements TR5 and TR3. While switching elements TR3 through TR6 were connected in an H-bridge configuration, other DC-to-AC converting circuits are possible. For example, switching elements TR1 through TR6 may instead be comprised of a plurality of switching elements connected in series or in parallel and switching elements TR1 through TR6 are not limited to field-effect type transistors. Finally, the output filtering circuit 4 is not limited to the construction illustrated in FIG. 1, and it may instead be constructed using a coil.

What is claimed is:

1. A circuit comprising:
    a direct current power source,
    a first circuit that converts a direct current source from the direct current power source into an alternating current for supply to a load,
    a second circuit that disconnects the first circuit from the direct current power source, if an over-current state is detected in the first circuit and
    a third circuit that stores energy generated by the first circuit and continues to provide alternating current to the load after the second circuit has disconnected the first circuit from the power source.

2. A circuit as set forth in claim 1, wherein the third circuit comprises a closed circuit that includes the load in a current path.

3. A circuit as set forth in claim 2, wherein the closed circuit includes an inductor.

4. A circuit as set forth in claim 3, further including a fourth circuit that filters noise from the alternating current generated by the first circuit, wherein the inductor also performs a filtering function.

5. A circuit as set forth in claim 1, further comprising a voltage boosting circuit coupled to the direct current power source and the first circuit, wherein the voltage boosting circuit boosts the voltage of the direct current power source to generate the direct current that is converted into the alternating current by the first circuit.

6. A circuit as set forth in claim 5, further including a filtering circuit that removes noise from the direct current power source.

7. A circuit as set forth in claim 1, wherein the first circuit comprises:
    at least a first, second, third and fourth switching element;
    a first series circuit between the first switching element and the fourth switching element,
    a second series circuit between the second switching element and the third switching element, wherein the first and second series circuits are connected in parallel between a positive input terminal and a negative input terminal of the direct current power source, wherein a first node connecting the first switching element and the fourth switching element and a second node connecting the second switching element and the third switching element are coupled to an alternating current output terminal,
    a first diode connected in reverse continuity to at least one of the first and third switching elements and
    a second diode connected in reverse continuity to at least one of the second and fourth switching elements.

8. A circuit as set forth in claim 7, wherein the second circuit turns off at least two of the switching elements when the output current exceeds an over-current set value.

9. A circuit as set forth in claim 7, wherein an inductor is connected to at least one of the first node and the second node.

10. A circuit as set forth in claim 9, further including a filtering circuit for removing noise from the alternating current generated by the first circuit, wherein the inductor also performs a filtering function.

11. A circuit comprising:
    first means for converting a direct current into an alternating current for supply to a load,
    second means for disconnecting the first means from a direct power source if an over-current state is detected in the first means,
    third means for storing energy generated by the first means and
    fourth means for continuing to provide alternating current to the load when the second means has disconnected the first means from the direct current power source, said fourth means supplying energy from the third means to the first means.

12. A circuit as in claim 11 wherein the first means comprises:
    at least a first, second, third and fourth switching element;
    a first series circuit between the first switching element and the fourth switching element,
    a second series circuit between the second switching element and the third switching element, wherein the first and second series circuits are connected in parallel between a positive input terminal and a negative input terminal of the direct current power source, wherein a first node connecting the first switching element and the fourth switching element and a second node connecting the second switching element and the third switching element are coupled to an alternating current output terminal, a first diode connected in reverse continuity to at least one of the first and third switching elements and a second diode connected in reverse continuity to at least one of the second and fourth switching elements.

13. A circuit as in claim 12 wherein the third means comprises at least one inductor coupled to the alternating current output terminal.

14. A circuit as in claim 13 wherein the fourth means comprises a closed circuit formed by at least one of the first and second diode, at least one of the first and fourth switching elements or one of the second and third switching elements, the at least one inductor and the load.

15. A circuit as in claim 14 wherein the second means comprises:

means for detecting an output current in the first means, means for comparing the detected output current to a reference value and means for generating a disconnecting signal if the detecting output current exceeds the reference value.

16. A circuit as in claim 15 wherein the disconnecting signal is coupled to at least one of the first and fourth switching element and at least one of the second and third switching elements.

17. A circuit comprising:

a DC-to-AC converter adapted for connection to a power source;

an output current-detecting circuit coupled to the DC-to-AC converter and operative to disconnect the DC-to-AC converter from the power source if the output current exceeds a predetermined value; and an energy storing circuit coupled to the DC-to-AC converter and operative to continue to generate an alternating current output from energy stored in the energy storing circuit upon disconnection of the AC-to-DC converter from the power source.

18. A circuit as in claim 17 further comprising a first filter coupled to the DC-to-AC converter, wherein the energy storing circuit is an inductor and the inductor forms part of the filter.

19. A circuit as in claim 18 further comprising a voltage boosting circuit coupled to the power source and the DC-to-AC converter.

20. A circuit as in claim 19 further comprising a second filter coupled to the power source.

* * * * *